United States Patent [19]

Schneider

[11] Patent Number: 4,602,384
[45] Date of Patent: Jul. 29, 1986

[54] AQUATIC ATTACK PROTECTION SUIT AND MATERIAL THEREFOR

[76] Inventor: David P. Schneider, 4 Woodside Dr. E., Apalachin, N.Y. 13732

[21] Appl. No.: 529,380

[22] Filed: Sep. 6, 1983

Related U.S. Application Data

[63] Continuation-in-part of Ser. No. 198,589, Oct. 20, 1980, abandoned.

[51] Int. Cl.[4] .......................................... A41D 13/00
[52] U.S. Cl. ................................................ 2/2; 2/69; 2/79; 428/907; 441/103
[58] Field of Search ................... 2/2, 2.1 R, 2.1 A, 69, 2/69.5, 239, 243 R, 79; 128/132 R; 428/907, 905, 206, 305.5; 441/102, 103, 86

[56] References Cited

U.S. PATENT DOCUMENTS

| | | | |
|---|---|---|---|
| 3,490,454 | 1/1970 | Goldfarb et al. | 428/907 X |
| 3,578,482 | 5/1971 | Whitaker et al. | 428/905 X |
| 3,623,659 | 11/1971 | Malerson et al. | 428/905 X |
| 4,152,784 | 5/1979 | McGalliard | 2/239 |
| 4,185,327 | 1/1980 | Markve | 2/79 |
| 4,232,742 | 11/1980 | Dick | 428/305.5 X |
| 4,277,024 | 7/1981 | Spector | 428/905 X |
| 4,345,716 | 8/1982 | Armstrong et al. | 428/905 X |

Primary Examiner—H. Hampton Hunter
Attorney, Agent, or Firm—Keith T. Bleuer

[57] ABSTRACT

A suit for protecting the wearer against shark attack including a plurality of cells formed in the material of the suit which contain a shark-repulsive chemical. The material of which the suit is made includes an inner ply of strong filamentary fabric capable of resisting shark bite and an outer ply of relatively thin, frangible material, with the cells carrying the shark-repulsive chemical being formed between the two plies. Other chemicals alternately may be used in the cells for other purposes, such as for heating purposes on the interaction of two initially separated chemicals in the cells.

8 Claims, 6 Drawing Figures

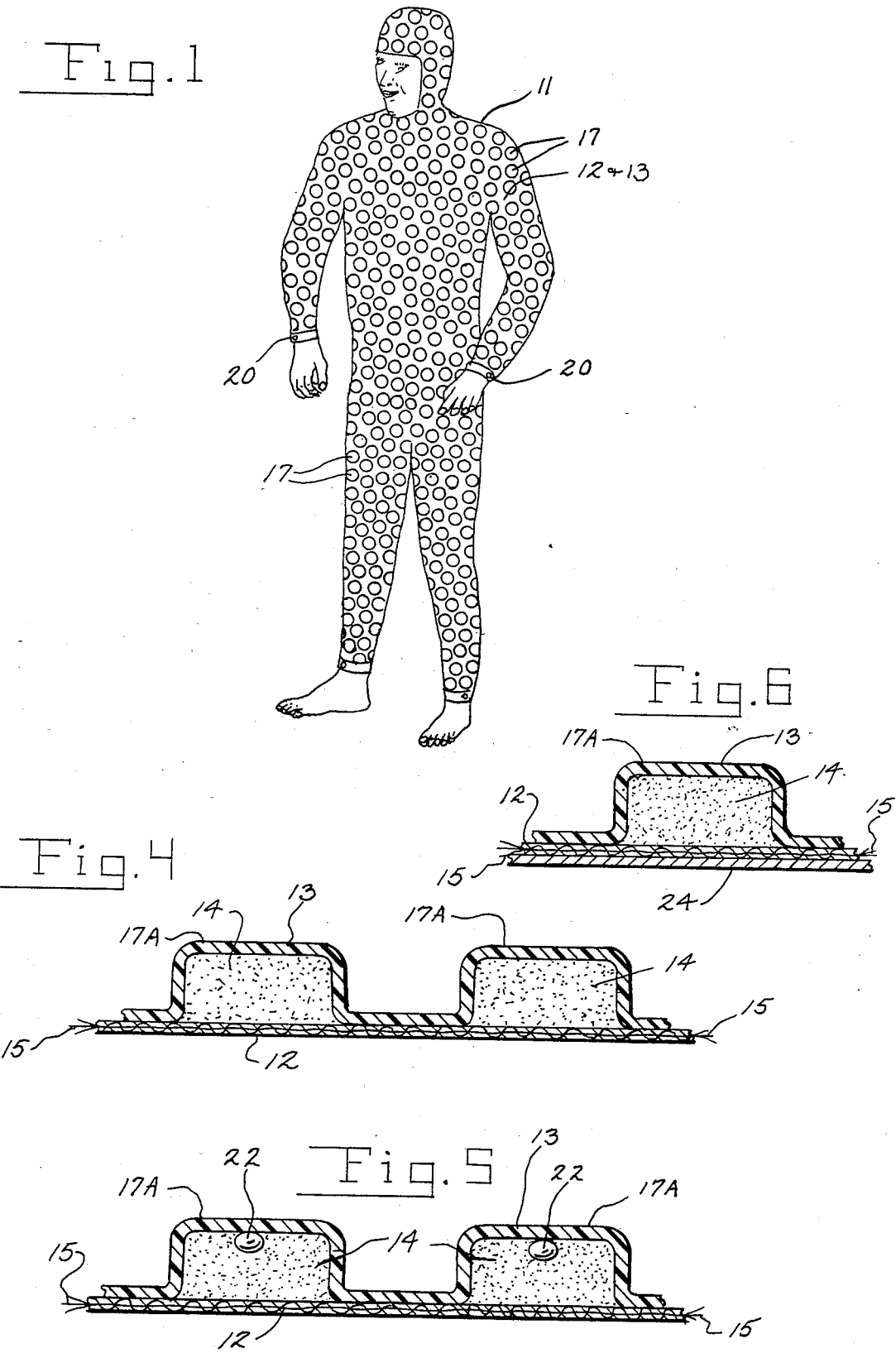

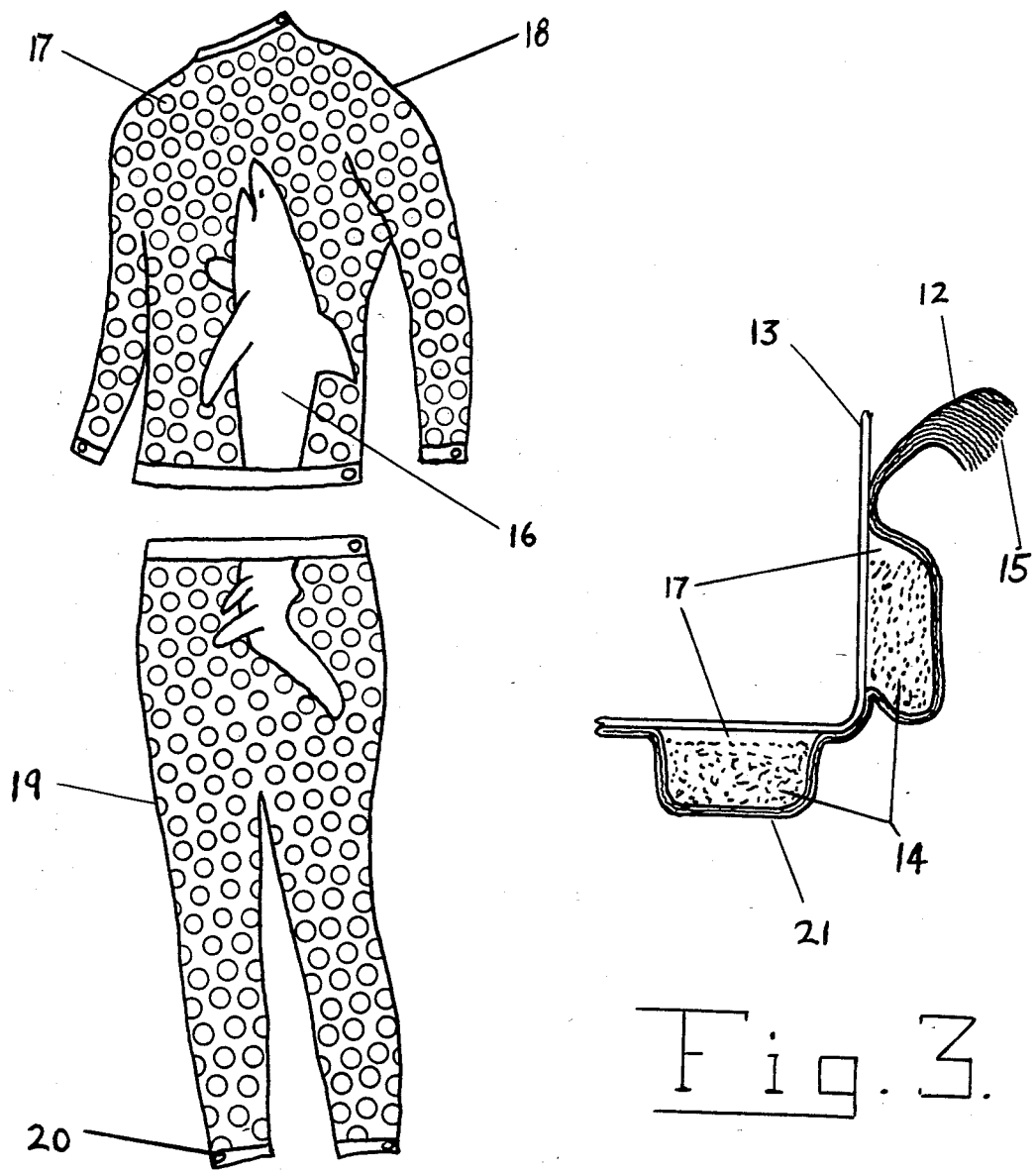

4,602,384

AQUATIC ATTACK PROTECTION SUIT AND MATERIAL THEREFOR

CROSS REFERENCES TO RELATED APPLICATIONS

This application is a continuation-in-part of my pending patent application Ser. No. 198,589; filed Oct. 20, 1980 for Aquatic Attack Protection Suit and now abandoned.

BACKGROUND OF THE INVENTION

The invention relates to suits for humans having built-in receptacles for containing chemicals that will protect a person from the bites, stings, and attacks of wild creatures, such as sharks, in the water, or will provide other beneficial affects such as repulsing insects and viperous snakes when the suit is used on land or for emitting light when used at sea so that the wearer may more easily be located.

The necessity for protecting humans lost at sea and immersed in water inhabited by sharks, in particular, has long been recognized as a serious problem; and many solutions have been proposed. One of the proposed solutions is to provide anti-shark suits formed of steel mesh. Such a suit provides some protection; however, it is quite heavy, such as 16 lbs. for one particular suit of this type.

SUMMARY OF THE INVENTION

It is an object of the present invention to provide an improved anti-shark suit which has built-in receptacles for shark-repelling chemicals so that, when a shark first bites its intended victim having such a suit, the chemical acts on the shark to repel it and, thus, protect the wearer. Such a suit when other chemicals are used in the receptacles is useful for other purposes, such as for heating the wearer or for emitting light for rescue at sea.

It is a more detailed object of the present invention to provide such a suit with built-in chemical receptacles which is made up of a basic filamented fabric of such strength that it inhibits the progress of the teeth of a shark with an outer layer of relatively frangible material and completing the chemical receptacles so that these receptacles are destroyed by a first bite from a shark which is predictably of little force to release the shark-repelling chemicals to thereby repel the shark and prevent any additional, more forceful bites.

It is a further object of the invention to provide an improved material for such a suit, made up of two plies; one of which is relatively strong and the other of which is relatively frangible, with cells being formed between the two materials for carrying chemicals for repelling sharks, emitting light when used at sea, etc.

BRIEF DESCRIPTION OF THE DRAWINGS

FIG. 1 is a view of a person wearing the full protection suit of the invention formed of the double layer cellular sheet material of the invention;

FIG. 2 is a view of a two-part suit formed of the two-ply cellular sheet material of the invention;

FIG. 3 is a cross sectional view of the two-ply sheet material with shark-repulsive chemical sealed in each cell; and, FIGS. 4, 5 and 6 are views similar to FIG. 3 and showing modifications of the two-ply material of the invention.

DESCRIPTION OF THE PREFERRED EMBODIMENTS

Referring now to the drawings wherein like reference characters indicate like parts in the several views, there is shown in FIG. 1 a single piece aquatic attack protection suit 11 and there is shown in FIG. 2 a two-part suit, both being constructed in accordance with the principles of the invention, and being particularly suitable for use by divers. The two-part suit shown in FIG. 2 comprises a long-sleeved shirt 18 and pants 19 with elastic snap enclosures 20 on cuffs, waists, and feet openings. If desired, either of these suits may be supplied with or without a hood, such as shown in FIG. 1, with different types of closures other than snaps, or with no closures at all. If desired, either of the suits may be marked by colored inks or other pigmented materials to produce the camouflage image desired, such as a shark image 16 shown in FIG. 2.

Both the FIG. 1 and FIG. 2 suits are formed from a composite two-ply material 21 shown in detail in FIG. 3 comprising a fabric 12 having filaments 15 and a layer 13 of a relatively frangible plastic, such as polyethylene sheet. The sheets 12 and 13 are sealed together except for spaced portions of the material 12 which, together with the polyethylene sheet 13, form discrete round cells 17. The cells 17 are partially filled with chemical 14, such as in the form of powder, which is of a type that when mixed with sea water repels sharks.

The chemical 14 may, for example be sodium lauryl sulfate, in the form of a powder. This chemical is harmless to humans, but when mixed with sea water it attacks the tissues of a shark's gills and can kill a shark in only small quantities. It is contemplated that each of the cells 17 shall be of substantial size and capacity so that a substantial amount of the chemical 14 is contained in each of the cells. The cells, for example, can be one to two inches in diameter and can be one-half inch to one inch, for example, in thickness. Thus, the volume of a cell 17 can, for example, be about 1.5 cubic inches and can well vary from 1 to 4 cubic inches with changes in dimensions of the cells. The amount of chemical 17 in the cells takes up about 80% to 90% of this volume. This substantial volume of chemical assures that when a person wearing a protective suit according to the invention is attacked by a shark, sufficient quantities of the chemical will be released to cause the shark to either be seriously injured or at least retreat. Substantially, the complete surfaces of the suits of the invention have the cells 17 in them; and there may be, for example, a spacing of less than an inch, about one-fourth inch, between the cells 17. Care is taken in making the suits so that none of the cells 17 is punctured in making any necessary seams in the material 21 to release the chemical therein.

The sheet 13 is relatively thin and frangible, while the sheet 12 is a high-strength fabric of interwoven warp and woof filaments, and the warp filaments 15 are shown in FIG. 3. The sheet 13 may be, for example, a sheet of polyethylene of 3 mils or 0.003 inch thickness. The fabric 12 may be formed of Kevlar (E. I. Dupont de Nemours & Co. trademark) filaments which are aramid fibers. More particularly, the fabric 12 can be the type 748 Kevlar ® fabric sold by Clark-Schwebel Fiber Fiber Glass Corporation of White Plains, N.Y. 10604 having a weight of 18.6 oz./sq. yd., a thickness of 0.031 inch, a fiber count of 48×48, a tensile strength of 2200 lbs. warp and 2300 lbs. fill, a yarn denier of 1500 warp and 1500 fill, and a basket 8×8 weave. This fabric thus has one of the highest tensile strengths available. It is relatively heavy; however, weight is not a factor for divers inasmuch as they wear weight belts regardless to reduce the natural buoyance of the diver.

In order to make the shark repellent garments 11, 18, and 19, the fabric sheet 12 is first heat-formed on a knobbed roller to provide indentations in the fabric which will form the cells 17 containing the repulsive chemical 14 in the finished sheet 21. The two sheets 12 and 13 are then heat-sealed together so as to delineate the cells 17 using a pair of heated, waffle-surfaced rollers to accomplish the joining of the two sheets together according to a usual method for making a common air cell, two-ply, plastic sheeting material. During the joining of the sheets 12 and 13 using these rollers, the chemical 14 is introduced between the sheets 12 and 13 as they are in the process of being sealed together, thereby trapping a portion of the chemical 14 inside each cell 17. The introduction of the chemical 14 is accomplished mechanically, such as by using a mechanical shaker distributing the chemical 14 evenly across the upturned pocketed surface of sheet 12 so that the chemical 14 falls into these pockets. After this composite two-ply material 21 has thus been produced, it is cut into the proper shapes for forming the completed suits, taking care not to cut through any of the cells 14; and these parts are then heat-sealed together to form the suits as shown in FIG. 1 and 2.

The fabric 12 is worn next to the skin of a person using the suits of the invention so that the relatively frangible polyethylene sheet 13 is exposed to the outside. The successful use of the suits of the invention depends to a large extent on the way most sharks normally attack. Most sharks first nibble the apparent prey, apparently to first taste the prey before actually taking a determined bite. During this first nibbling by the shark, since the sheet 13 is thin and frangible, the polyethylene sides of the cells 17 so nibbled by the shark are completely destroyed and release the chemical 14 in these cells. A shark's teeth are long and very sharp and are capable of inflicting grievous wounds on a swimmer, but since most sharks only nibble initially, these teeth only are effective at that time to destroy the coverings of the cells 17 so attacked to release the chemical 14. As previously mentioned, the chemical 14 is of a type, such as sodium lauryl sulfate, to disable the shark; and he thus is either seriously injured or at least is repulsed immediately. Although the fabric 12 is flexible, so that the user may easily swim, it nevertheless has great tensile strength and stretches only a small amount under biting pressure from the shark and materially impedes shark teeth to constitute a strong protective device, affording good protection to the user.

It is manifest that numerous modifications of the invention may be made without departing from the principles of the invention. For example, other effective methods of sealing the plastic sheets 12 and 13 together in addition to heat sealing may be utilized, such as the use of adhesives or solvent bonding agents placed between the sheets so that they adhere to each other. Also, if it is desired to use other than Kevlar fabric for the sheet 12, a rubberized fabric or a cloth of nylon thread or other synthetic or natural fiber may be used; however, such fabric should very preferably have substantial strength so as to protect the user.

As above described, the material 21 has been shown with the cells 17 formed initially in the fabric 12. The cells 17 may instead be initially formed in the polyethylene outer sheet 13 as shown in FIG. 4 for the chemical containing cells 17A.

It is apparent that if other chemicals in lieu of the shark repulsive chemical is used in the cells 17, the suits of the invention may be used for other applications. For example, the shark repulsive chemical in the cells 17 could be changed to any well known liquid insecticide to be repulsive to insects and snakes and the suits therefore would be advantageous for use for wear in jungles and forests. In this land application, the wearer could produce punctures in the cells 14, particularly through frangible sheet 13 so as to intentionally allow vapor from the repellent chemicals to slowly escape the cells 17 and discourage the insects or snakes from inhabiting the wearer's vicinity over long periods of time. As a second example, using the two-ply material 21, the chemicals entrapped in the cells 17 could be a liquid perfume or deodorant in which case the wearer would use the plastic-celled material 21 as an underarm dress shield cut only large enough to attach inside the armpit section of the wearer's normal clothing. Yet another example of alternate usage of the two-ply material 21, a liquid detergent soap could be placed in the cells 17 so that the user could intentionally puncture the cells to permit the soap's slow escape which would permit washcloth-sized pieces of the material 21 to act as a self-soaping scrub cloth.

As still another practical application of the suits of the invention, the cells 17A could each be sealed with two distinctly different chemicals for either heating or providing a gas for flotation. In these cases, each of the cells 17A (see FIG. 5) has therein a small sealed cell 22 containing one chemical while the cell 17A has another chemical within it and surrounding the cell 22. The cell 22 is made of easily rupturable material such as polyethylene and is fixed on the inner surface of the polyethylene forming the outer part of a cell 17A so that the cell 22 may be easily broken by pressing on or squeezing the cells 17A. If the cell 22 has, for example, sodium hydroxide within it, while water is substantially filling the cell 17A about the cell 22, the water mixing with the sodium hydroxide will cause the water to heat; and the suit will function as a heating suit. If the cell 22 has sodium within it as the chemical, with water being in the cell 17A and surrounding the small cell 22, the mixing of the sodium and water when the small cell 22 is ruptured by pressure from the wearer will generate a gas in the cell 17A so that the suit will function as a flotation device for the wearer. The cell arrangement shown in FIG. 5 may also be used for light emission, and in this case the chemicals within the internal cells 22 and 17 might be those mentioned in U.S. Pat. Nos. 3,576,987 and 3,597,362.

As another alternative application of the principles of the invention, the sheet 12 could be formed of the same frangible plastic sheeting material as the sheet 13; and, in this case, a separate internal suit of the Kevlar ® material might be provided for protecting the user against biting by the shark.

The form of fabric illustrated in FIG. 3 in which the cells 17 are formed in the fabric 12 is preferred for the use of the invention as a shark repellant suit in which the diver wishes to swim at times. Only the cells 17 rather than a complete expanse of the suit is thus in contact with the skin of the user, and thus the fabric as shown in FIG. 3 is more flexible than if the cells were instead formed in the polyethylene sheet 13 as illustrated in FIG. 4. The composite material 21 is shown bent at 90 degrees in FIG. 3 to illustrate its flexibility. For other uses of the material in which the user pinches the cells to rupture the smaller cells 22 or to rupture the main cells 17 of the material, the forms of the material shown in FIGS. 4 and 5 in which the cells 17A protrude from the outer surface is preferred since the cells 17A are more accessible to the user. Such outwardly protruding cells 17A on the outer surface of the suit would, however, tend to slow the user in swimming by causing water turbulence, and this constitutes another reason for using the FIG. 3 form of the material of the invention for diving or swimming.

As another modification, the materials of FIGS. 3, 4 and 5 could be used to provide a sea rescue suit. In this case, a third of the cells 17 or 17A could have the shark repellant chemical in them; another third of these cells could have the heating chemical in them, and the other cells could have the gas producing chemical in them. For the gas producing and heating chemicals, the small cells 22 would be provided in the cells 17 or 17A. Thus, the sea rescue suit would provide protection against sharks as well as heating and buoying the wearer.

As previously mentioned, the shark repelling chemical may be in the form of a powder. It is contemplated that the grains of this powder may be coated with a water retardant chemical with the grains of the powder being coated with different thicknesses of the coating so that the sea water does not reach all of the grains at once but reaches them at various times. This coating chemical may be of the type now used for causing the extended time release of medicines within the stomach of a user. The fabric 12 is somewhat pervious to water, and some water does reach the diver, seeping into his suit; so that the shark repellant powder is activated over a period of time. Thus, the shark repellant chemical is caused to surround the diver in the water and form a continuous protection for him even before attack by a shark.

In the event that it is not desired to have the chemical 14 continuously active due to sea water seeping through the somewhat water pervious fabric 12, the water impervious coating 24 (see FIG. 6) may be provided on the surface of the fabric 12 opposite the chemical 14. The coating 24 may be sprayed, for example, on the fabric 12 and may be of the type which is flexible and waterproof and is commonly used on canvas for waterproofing it for use in tents, for example. The celled material shown in FIG. 6 thus is impervious to water from both sides, either outside of the diver or from inside the suit, so that the chemical is not affected by sea water until one of the cells 17A is actually ruptured. The coating 24 is also useful in the cases in which other chemicals, such as for heating or producing gas, are used in the cells 17 or 17A.

I claim:

1. A material suitable for a person's garment including two opposite plies each having a substantial expanse both lengthwise and crosswise, one of said plies being a thin, homogeneous, flimsy, easily rupturable and penetrable sheet of plastic of a few thousandths inch of thickness and the other ply being of a fabric having strong warp and woof filaments, said plies being attached together except in spaced regions forming discrete cells which are about 1 to 2 inches in dimension across and are spaced less than an inch apart, one of said plies bulging out and away from the other said plies for about one-half to one inch so that the internal volume of each of said cells is between 1 to 4 cubic inches, and a chemically active chemical substance in said cells which is in a state in which parts of the chemical substance are freely movable with respect to other parts of the chemical substance.

2. A material as set forth in claim 1, said fabric being substantially flat and said sheet of plastic being deformed out of flat condition so as to form said cells between the deformed parts thereof and said fabric.

3. A material as set forth in claim 1, said plastic being substantially flat and said fabric being deformed out of flat condition so as to form said cells between the deformed parts thereof and said sheet of plastic.

4. A material suitable for a person's garment including two plies, one of said plies being of a thin, homogeneous, flexible, frangible plastic sheet material and the other ply being of a fabric having strong warp and woof filaments, said plies being attached together except in spaced regions forming discrete cells, said cells being about 1 to 2 inches in dimension across and being spaced less than an inch apart, a chemically active chemical in said cells, and additional small cells of thin, frangible plastic material within said first named cells and containing another chemical which is chemically reactive with said first named chemical.

5. A material as set forth in claim 4, said additional small cells within said first named cells being fixed to an inner surface of each of said first named cells.

6. A garment for the human form made of a material including two opposite plies each having a substantial expanse both lengthwise and crosswise, one of said plies being a thin, homogeneous, flimsy, easily rupturable and penetrable sheet of plastic of a few thousandths inch in thickness and the other ply being of a fabric having strong warp and woof filaments, said plies being attached together except in spaced regions forming discrete cells which are about 1 to 2 inches in dimension across and are spaced less than an inch apart, one of said plies bulging out and away from the other of said plies for about one-half to 1 inch so that the internal volume of each of said cells is between 1 to 4 cubic inches, and a chemically active chemical substance in said cells which is in a state in which parts of the chemical substance are freely movable with respect to other parts of the chemical substance.

7. A garment as set forth in claim 6, one of said plies being flat and the other of said plies being deformed and bulging out of flat condition so as to provide said cells between the deformed parts thereof and said other ply, the deformed parts of the ply deformed out of flat condition being on the inside of the garment.

8. A garment as set forth in claim 6, one of said plies being flat and the other of said plies being deformed and bulging out of flat condition so as to provide said cells between the deformed parts thereof and said other ply, the deformed parts of the ply deformed out of flat condition being of the exterior of the garment.

* * * * *